United States Patent [19]

Itoh

[11] Patent Number: 5,292,592
[45] Date of Patent: Mar. 8, 1994

[54] OPTICAL INFORMATION RECORDING MEDIUM IN WHICH A PROTECTIVE LAYER COMPRISES A NI-CR ALLOY LAYER

[75] Inventor: Masaki Itoh, Tokyo, Japan
[73] Assignee: NEC Corporation, Tokyo, Japan
[21] Appl. No.: 880,017
[22] Filed: May 8, 1992

[30] Foreign Application Priority Data
May 10, 1991 [JP] Japan ................................. 105848

[51] Int. Cl.$^5$ .................... B32B 15/08; G11C 13/06; G11B 7/24
[52] U.S. Cl. .................................. 428/626; 428/652; 428/678; 428/928; 428/900; 365/122; 369/288
[58] Field of Search ............... 428/611, 650, 651, 900, 428/928, 694, 680, 666, 694 ML, 694 RL, 626, 652, 678; 365/122, 123; 369/288

[56] References Cited
U.S. PATENT DOCUMENTS
4,717,628 1/1988 Takahashi et al. .............. 428/928

FOREIGN PATENT DOCUMENTS
0406569 1/1991 European Pat. Off. .
61-24040 2/1986 Japan .
3-8109 5/2926 Japan .

OTHER PUBLICATIONS
Sakuya Tamada et al., "Design Concept of Magneto-Optical Disk", Japanese Journal of Applied Physics, vol. 28 (1989), Supplement 28-3, pp. 67-70.

Primary Examiner—Benjamin R. Fuller
Assistant Examiner—Valerie Ann Lund
Attorney, Agent, or Firm—Sughrue, Mion, Zinn, Macpeak & Seas

[57] ABSTRACT

In an optical information recording medium comprising a substrate (11) of polycarbonate, a recording layer, and a reflecting layer (14) covering the reflecting layer and containing Al, an alloy layer (17) of a Ni-Cr alloy is deposited on the reflecting layer to sufficiently protect transmission of moisture into the reflecting layer. A covering layer (18) of ultraviolet curable resin may be deposited on the alloy layer. The recording layer is formed on the substrate and includes a magneto-optical layer (13) sandwiched between first and second interference layers (15, 16). For protecting transmission of moisture into the substrate, it is preferable that an additional layer (21) of $SiO_2$ is deposited on the substrate opposite to the recording layer.

9 Claims, 2 Drawing Sheets

OPTICAL INFORMATION RECORDING MEDIUM IN WHICH A PROTECTIVE LAYER COMPRISES A NI-CR ALLOY LAYER

BACKGROUND OF THE INVENTION

This invention relates to an optical information recording medium, such as a magneto-optical disk, which is used for recording information by an irradition of a laser beam.

Various optical information recording media of the type are already known. For example, an optical information recording medium is disclosed by Sakuya Tamada and five others in Japanese Journal of Applied Physics, Vol. 28 (1989), Supplement 28-3, pp. 67–70, under the title of "Design Concept of Magneto-Optical Disk".

In the manner which will later be described more in detail, the recording medium comprises a substrate, a protective layer, a recording layer between the substrate and the protective layer, and a reflecting layer between the protective and the recording layers. The substrate is made of polycarbonate and therefore is transparent for the laser beam. The protective layer is made of an organic material. The reflecting layer contains aluminum (Al) and therefore is opaque for the laser beam.

As will later be described in detail, the recording medium has a recording density which is relatively high. Therefore, the recording medium enables an information recording system to have a large record capacity.

It is assumed that the reflecting layer is subjected to oxidation and deflection when the recording medium is used or preserved in an environment of a high temperature and humidity for a long time. Namely, the recording medium is disadvantageous in its weather resistance. This is because the protective layer of the organic material is insufficient to protect transmission of moisture.

SUMMARY OF THE INVENTION

It is therefore an object of this invention to provide an optical information recording medium which has an excellent weather resistance.

It is another object of this invention to provide an optical information recording medium which is of the type described and in which a reflecting layer is not subjected to oxidation.

It is still another object of this invention to provide an optical information recording medium which is of the type described and in which a deflection does not occur even when preserved in a hot and humid environment for a long time.

Other objects of this invention will become clear as the description proceeds.

According to this invention, there is provided an optical information recording medium comprising a substrate, a protective layer, a recording layer between said substrate and said protective layer, and a reflecting layer between said protective and said recording layers, said reflecting layer containing Al, said protective layer comprising an alloy layer of a Ni-Cr alloy on said reflecting layer.

DESCRIPTION OF THE PREFERRED EMBODIMENTS

Figure 1:
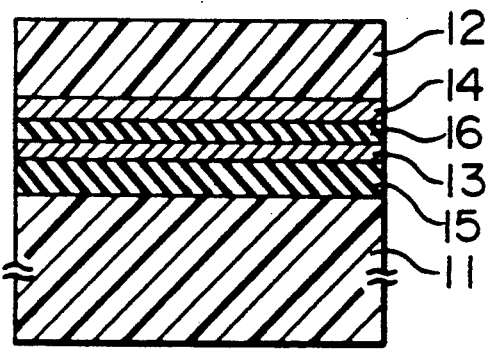
FIG. 1 is a sectional view of a conventional optical recording medium.

Referring to FIG. 1, a conventional optical information recording medium will first be described for a better understanding of this invention. The conventional recording medium is generally called a magneto-optical disk and is used for recording information by an irradiation of a laser beam.

The recording medium comprises a substrate 11, a protective layer 12, a recording layer 13 between the substrate 11 and the protective layer 12, and a reflecting layer 14 between the protective and the recording layers 12 and 13. The substrate 11 is made of polycarbonate and therefore is transparent for the laser beam. The protective layer 12 is made of an organic material alone. The recording layer 13 is made of ferri-magnetic amorphous alloy which is composed of iron and rare-earth metal used as transition metals. The recording layer 13 may be called a magneto-optical layer. The reflecting layer 14 is made of an Al alloy and therefore is opaque for the laser beam.

The recording medium further comprises first and second interference layers 15 and 16. Each of the first and the second interference layers 15 and 16 is made of silicon nitride and is transparent for the laser beam. The first interference layer 15 is between the substrate 11 and the recording layer 13. The second interference layer 16 is between the recording and the reflecting layers 13 and 14.

For carrying out a recording and reading operation of the information, the laser beam is irradiated onto the recording layer 13 through the substrate 11 and the first interference layer 15. The laser beam is focused to have a beam diameter of about 1.4 microns on the recording layer 13. Responsive to the laser beam, the recording layer 13 carries out the recording and the reading operation in the manner known in the art. Inasmuch as the laser beam is focused, the recording medium has a recording density which is relatively high.

The laser beam has a part which is incident to the second interference layer 15 through the recording layer 13. Each of the first and the second interference layers 15 and 16 produces a multiple interference effect in the manner known in the art. As a result, the recording and reading operation is reliably carried out even when the laser beam has beam energy which is relatively small.

The laser beam is emitted from a laser source (not shown) in the manner known in the art. As the laser source, use is made of a semiconductor laser having a wavelength between 6700 and 8300 angstroms.

The reflecting layer 14 is subjected to oxidation when the recording medium is used or preserved in an environment of a high temperature and humidity for a long time. This is because the protective layer 12 is insufficient to protect transmission of moisture.

Figure 2:
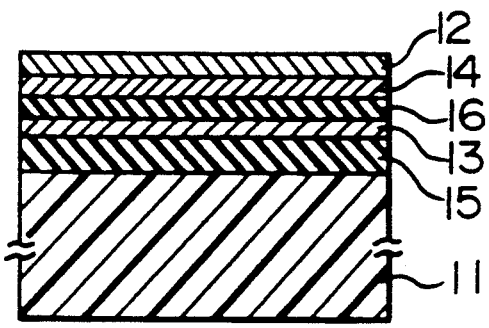
FIG. 2 is a vertical sectional view of an optical recording medium according to a first embodiment of this invention.

Referring to FIG. 2, the description will be directed to an optical information recording medium according to a first embodiment of this invention. The recording medium comprises similar parts designated by like reference numerals.

In the recording medium, the protective layer 12 is made of only a Ni-Cr alloy on the reflecting layer 14. The substrate 11 is made of polycarbonate. The substrate 11 may be composed of a selected one of a glass plate and an acrylic resin plate which are coated with photopolymer. It is preferable that the substrate 11 has guide grooves and guide pits for carrying out a predetermined tracking servo which is known in the art.

Each of the first and the second interference layers 15 and 16 is made of silicon nitride. Alternatively, each of the first and the second interference layers 15 and 16 may be made of a selected one of a mixture of zinc sulfide and metal oxide, a mixture of zinc sulfide and metal nitride, a mixture of zinc sulfide and metal carbide, a mixture of zinc sulfide and metal fluoride, the mixture of zinc sulfide and metal boride, and a mixture of zinc sulfide and other metal sulfide. Each of the first and the second interference layers 15 and 16 may be made of a selected one of polymetal oxide having a high refractive index, aluminum nitride, nitric silicon oxide, and sialon. As a further alternative, a multilayer film may be used as each of the first and the second interference layers 15 and 16.

It is preferable that the recording layer 13 is composed of at least one material selected from a group consisting of TbFe, TbFeTi, TbFeCr, TbFeNi, TbFeNiCr, TbFeTa, TbFeNb, TbFePt, TbFeCo, TbFeCoTi, TbFeCoCr, TbFeCoNi, TbFeCoNiCr, TbFeCoTa, TbFeCoNb, TbFeCoPt, TbDyFeCo, TbDyFeCoTi, TbDyFeCoCr, TbDyFeCoNi, TbDyFeCoNiCr, TbDyFeCoTa, TbDyFeCoNb, TbDyFeCoPt, TbNdFeCo, TbNdFeCoTi, TbNdFeCoCr, TbNdFeCoNi, TbNdFeCoNiCr, TbNdFeCoTa, TbNdFeCoNb, and TbNdFeCoPt. TbFeCoTi is more preferable.

Figure 3:
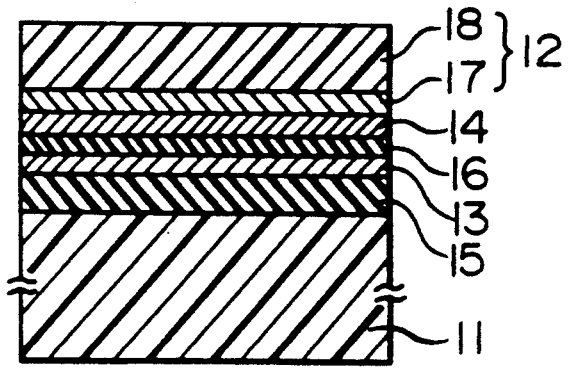
FIG. 3 is a vertical sectional view of an optical recording medium according to a second embodiment of this invention.

Turning to FIG. 3, the description will be directed to an optical information recording medium according to a second embodiment of this invention. The recording medium comprises similar parts designated by like reference numerals.

In the recording medium, the protective layer 12 comprises an alloy layer 17 on the reflecting layer 14 and a covering layer 18 covering the alloy layer 17. The alloy layer 17 is made of a Ni-Cr alloy alone. The covering layer 18 is made of ultraviolet curable resin.

Inasmuch as the alloy layer 17 is covered with the covering layer 18 of the ultraviolet curable resin, the recording medium is more advantageous in its weather resistance than the recording medium that is illustrated with reference to FIG. 2.

Figure 4:
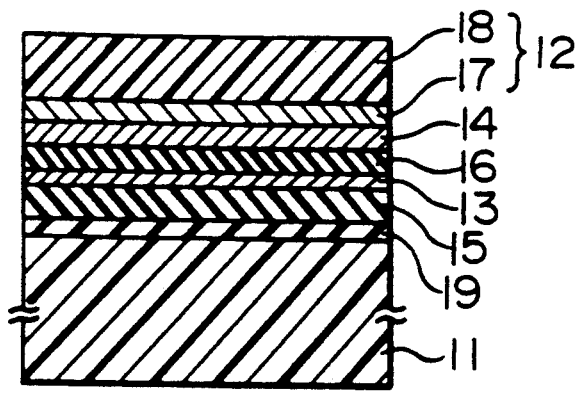
FIG. 4 is a vertical sectional view of an optical recording medium according to a third embodiment of this invention.

Turning to FIG. 4, the description will be directed to an optical information recording medium according to a third embodiment of this invention. The recording medium comprises similar parts designated by like reference numerals.

The recording medium further comprises an adhesion layer 19 between the substrate 11 and the first interference layer 15. The adhesion layer 19 is made of tantalum oxide. The adhesion layer 19 is used in order that the first interference layer 15 may reliably adhere to the adhesion layer 19 and on the substrate 11.

The description will now proceed to a method of manufacturing the recording medium of FIG. 4 by the use of a sputtering device (not shown).

At first, a circular plate is placed in the sputtering device. The circular plate is made of polycarbonate to have a diameter of 86 mm and a thickness of 1.20 mm. After the sputtering device is evacuated into vacuum below $5 \times 10^{-7}$ Torr, the circular plate is subjected to first sputter etching to have a surface part removed to an approximate depth of 60 angstroms. This results in manufacturing the substrate 11.

A tantalum target is subjected to sputtering in a first gas mixture of argon and oxygen to deposit, on the substrate 11, the adhesion layer 19 to a thickness of 300 angstroms. A silicon target is subjected to sputtering in a second gas mixture of argon and nitrogen to deposit, on the adhesion layer 19, the first interference layer 15 to a thickness of 650 angstroms.

The first interference layer 15 is subjected to second sputter etching to have a surface part be removed to an approximate depth of 10 angstroms. A TbFeCoTi target is subjected to sputtering in an argon gas to deposit, on the first interference layer 15, a recording layer 13 to a thickness of 200 angstroms. A silicon target is subjected to sputtering in the second gas mixture to deposit, on the recording layer 13, the second interference layer 16 to a thickness of 250 angstroms. An Al-Ti alloy target (containing 1% by weight of Ti) is subjected to sputtering in the argon gas to deposit, on the second interference layer 16, the reflecting layer 14 to a thickness of 300 angstroms. An Ni-Cr alloy target (containing 20% by weight of Cr) is subjected to sputtering in the argon gas to deposit, on the reflecting layer 14, the alloy layer 17 to a thickness of 300 angstroms. In this manner, the optical information recording medium of FIG. 4 is partly manufactured to a half-completed medium.

After the alloy layer 17 is formed, the half-completed medium is brought out from the sputtering device into an atmospheric air. The alloy layer 17 is subjected to spin-coating with ultraviolet curable resin in the manner known in the art. As a result, the alloy layer 17 is covered by the ultraviolet curable resin. To the ultraviolet curable resin covering the alloy layer 17, ultraviolet rays are irradiated to form the covering layer 18 having an ultimate thickness of 10 microns.

The description will proceed to a test of characteristics of the recording medium of FIG. 4.

The recording medium is rotated at 3600 rpm. In this condition, a laser beam of a laser diode is irradiated onto the recording layer 13 through the substrate 11 and the first interference layer 15 and focused to have a reduced diameter which is substantially equal to 1.4 microns. Herein, the laser beam has a wavelength of 7800 angstroms. For a signal having a recording frequency of 2.12 MHz, writing operation is carried out at a radial distance of 30 mm with a duty ratio of 50%, a recording bias magnetic field of 300 oersted, and a recording power of 9 mW. Under the circumstances, the C/N ratio is equal to 46 dB. It is thus confirmed that the recording medium has an excellent recording sensitivity and an excellent signal quality.

After the recording medium was preserved in an environment of a temperature of 80° C. and a relative humidity of 90% for 500 hours, it was observed that neither oxidation nor stripping occurred. Therefore, the recording medium is sufficient for practical use.

Figure 5:
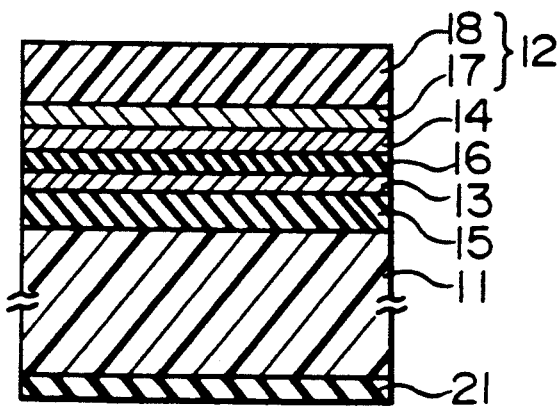
FIG. 5 is a vertical sectional view of an optical recording medium according to a fourth embodiment of this invention.

Turning to FIG. 5, the description will be directed to an optical information recording medium according to a fourth embodiment of this invention. The recording medium comprises similar parts designated by like reference numerals.

On describing the optical information recording medium with reference to FIG. 5, it may be mentioned here that the substrate 11 has first and second principal surfaces. The layers 15, 13, 16, 14, 17, and 18 are formed successively on the first principal surface.

The recording medium further comprises an additional layer 21 on the second principal surface of the substrate 11. The additional layer 21 is made of $SiO_2$ and is for protecting the transmission of the moisture into the substrate 11.

The recording medium is more advantageous in its weather resistance than the recording medium that is illustrated with reference to FIG. 2. More particularly, a deflection does not occur in the recording medium even when the recording medium is used or preserved in a hot and humid environment for a long time. This is because the additional layer 21 protects the transmission of the moisture into the substrate 11 in addition to the alloy and the covering layers 17 and 18 protecting the transmission of the moisture into the reflecting layer 14.

Figure 6:
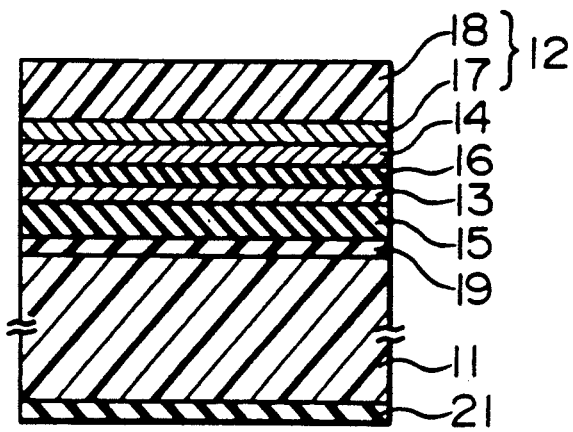
FIG. 6 is a vertical sectional view of an optical recording medium according to a fifth embodiment of this invention.

Turning to FIG. 6, the description will be directed to an optical information recording medium according to a fifth embodiment of this invention. The recording medium comprises similar parts designated by like reference numerals.

It is to be noted that the recording medium comprises the adhesion and the additional layers 19 and 21 in addition to the alloy and the covering layers 17 and 18.

The description will now proceed to a method of manufacturing the recording medium of FIG. 6. The method begins with manufacture of a half-made medium by the steps or processes which are described in conjunction with manufacture of the recording medium illustrated with reference to FIG. 4.

Subsequently, the half-made medium is again placed in the sputtering device. After the sputtering device is evacuated into vacuum below $9 \times 10^{-7}$ Torr, the substrate 11 is subjected to third sputter etching to have a surface part adjacent the second principal surface be removed to an approximate depth of 20 angstroms. A $SiO_2$ target is subjected to sputtering in the argon gas to deposit, on the substrate 11, the additional layer 21 to a thickness of 500 angstroms.

The recording medium has characteristics which are similar to that of the recording medium illustrated with reference to FIG. 4. After the recording medium was preserved in an environment of a temperature of 80° C. and a relative humidity of 90% for 500 hours, the recording medium was tested in the manner described in the recording medium of FIG. 4. It was observed that neither oxidation nor stripping occurred. Therefore, the recording medium is sufficient for practical use.

In the recording medium illustrated with reference to each of FIGS. 2 to 6, a combination of the recording, the first interference, and the second interference layers 13, 15, and 16 may be referred to as the recording layer.

While the present invention has thus far been described in connection with only a few embodiments thereof, it will readily be possible for those skilled in the art to put this invention into practice in various other manners. For example, the additional layer 21 may be produced before deposition of the covering layer 18 although the description is made as regards a case where the additional layer 21 is produced after deposition of the covering layer 18.

What is claimed is:

1. An optical information recording medium comprising a substrate, a protective layer, a recording layer between said substrate and said protective layer, and a reflecting layer between said protective layer and said recording layer, said reflecting layer containing Al, said protective layer comprising an alloy layer of a Ni-Cr alloy on said reflecting layer, said Ni-Cr alloy containing 20% by weight of Cr.

2. An optical information recording medium as claimed in claim 1, wherein said protective layer further comprises a covering layer covering said alloy layer, said alloy layer being between said covering layer and said reflecting layer.

3. An optical information recording medium as claimed in claim 2, wherein said covering layer is made of ultraviolet curable resin.

4. An optical information recording medium as claimed in claim 1, further comprising an additional layer of Si dioxide, said substrate being between said recording layer and said additional layer.

5. An optical information recording medium as claimed in claim 1, further comprising:
    a first interference layer between said substrate and said recording layer; and
    a second interference layer between said recording layer and said reflecting layer.

6. An optical information recording medium as claimed in claim 1, wherein said recording layer comprises a magneto-optical layer.

7. An optical information recording medium as claimed in claim 6, wherein said recording layer further comprises an interference layer between said substrate and said magneto-optical layer.

8. An optical information recording medium as claimed in claim 6, wherein said recording layer further comprises an additional interference layer between said reflecting layer and said magneto-optical layer.

9. An optical information recording medium as claimed in claim 1, wherein said recording layer is composed of at least one material selected from a group consisting of TbFe, TbFeTi, TbFeCr, TbFeNi, TbFeNiCr, TbFeTa, TbFeNb, TbFePt, TbFeCo, TbFeCoTi, TbFeCoCr, TbFeCoNi, TbFeCoNiCr, TbFeCoTa, TbFeCoNb, TbFeCoPt, TbDyFeCo, TbDyFeCoTi, TbDyFeCoCr, TbDyFeCoNi, TbDyFeCoNiCr, TbDyFeCoTa, TbDyFeCoNb, TbDyFeCoPt, TbNdFeCo, TbNdFeCoTi, TbNdFeCoCr, TbNdFeCoNi, TbNdFeCoNiCr, TbNdFeCoTa, TbNdFeCoNb, and TbNdFeCoPt.

* * * * *